(12) United States Patent
Graham et al.

(10) Patent No.: US 8,879,636 B2
(45) Date of Patent: Nov. 4, 2014

(54) ADAPTIVE VIDEO ENCODING APPARATUS AND METHODS

(75) Inventors: Carl Norman Graham, London (GB); Seow Chuan Lim, Thatcham (GB); Aris Aristodemou, London (GB); John R. M. Mason, Middlesex (GB); Tim Hall, Saint Albans (GB); Yazid Nemouchi, Berkshire (GB); Kar-Lik Wong, Wokingham (GB)

(73) Assignee: Synopsys, Inc., Mountain View, CA (US)

( * ) Notice: Subject to any disclaimer, the term of this patent is extended or adjusted under 35 U.S.C. 154(b) by 1392 days.

(21) Appl. No.: 12/154,783

(22) Filed: May 27, 2008

(65) Prior Publication Data

US 2008/0291995 A1 Nov. 27, 2008

Related U.S. Application Data

(60) Provisional application No. 60/931,879, filed on May 25, 2007.

(51) Int. Cl.
*H04N 7/12* (2006.01)
*H04N 21/2662* (2011.01)
*H04N 19/12* (2014.01)
*H04N 19/172* (2014.01)
*H04N 19/103* (2014.01)
*H04N 19/156* (2014.01)
*H04N 19/176* (2014.01)
*H04N 19/189* (2014.01)

(52) U.S. Cl.
CPC ....... *H04N 7/26244* (2013.01); *H04N 21/2662* (2013.01); *H04N 19/00078* (2013.01); *H04N 7/26271* (2013.01); *H04N 19/00018* (2013.01); *H04N 19/00206* (2013.01); *H04N 19/00345* (2013.01)
USPC ................................. 375/240.24; 375/240.16

(58) Field of Classification Search
None
See application file for complete search history.

(56) References Cited

U.S. PATENT DOCUMENTS

| 5,892,847 | A   | 4/1999 | Johnson |
|-----------|-----|--------|---------|
| 6,252,905 | B1* | 6/2001 | Pokrinchak et al. ...... 375/240.14 |
| 6,282,661 | B1  | 8/2001 | Nicol |
| 6,757,329 | B2  | 6/2004 | Morad et al. |
| 6,765,962 | B1* | 7/2004 | Lee et al. ................. 375/240.03 |

(Continued)

FOREIGN PATENT DOCUMENTS

| EP | 1 503 595    | 2/2005 |
|----|--------------|--------|
| JP | 2002-112274  | 4/2002 |

(Continued)

OTHER PUBLICATIONS

Osako, F., et al., "A Dynamic Computation Resource Scalable Algorithm for Software Video CODEC," NTG Fachberichte, VDE Verlag, 143:515-518 (1997).

(Continued)

*Primary Examiner* — Hassan Phillips
*Assistant Examiner* — Mark A Mais
(74) *Attorney, Agent, or Firm* — Fenwick & West LLP

(57) ABSTRACT

Methods and apparatus for adaptive encoding of data such as for example video data. In one exemplary embodiment, a real-time video encoder is disclosed that changes video encoding processes to produce the best quality encoded video while maintaining a target encoding frame rate, according to one or more operating constraints.

32 Claims, 4 Drawing Sheets

(56) References Cited

U.S. PATENT DOCUMENTS

| | | | |
|---|---|---|---|
| 6,862,563 | B1 | 3/2005 | Hakewill et al. |
| 6,876,703 | B2 * | 4/2005 | Ismaeil et al. ............ 375/240.16 |
| 6,961,378 | B1 * | 11/2005 | Greenfield et al. ....... 375/240.16 |
| 7,039,108 | B2 | 5/2006 | Bauer et al. |
| 7,111,179 | B1 | 9/2006 | Girson et al. |
| 7,180,943 | B1 | 2/2007 | Arlid et al. |
| 7,280,708 | B2 | 10/2007 | Song et al. |
| 8,442,337 | B2 * | 5/2013 | Zuo et al. ....................... 382/251 |
| 8,494,052 | B2 * | 7/2013 | Chang et al. ............. 375/240.16 |
| 2002/0025001 | A1 * | 2/2002 | Ismaeil et al. ............ 375/240.16 |
| 2003/0225998 | A1 | 12/2003 | Khan et al. |
| 2004/0001545 | A1 * | 1/2004 | Chang ...................... 375/240.12 |
| 2004/0233991 | A1 | 11/2004 | Sugimoto et al. |
| 2006/0018552 | A1 | 1/2006 | Malayath et al. |
| 2006/0062311 | A1 * | 3/2006 | Sun et al. ................. 375/240.24 |
| 2007/0071094 | A1 | 3/2007 | Takeda et al. |

FOREIGN PATENT DOCUMENTS

| | | |
|---|---|---|
| WO | WO-2006/094033 A1 | 9/2006 |
| WO | WO-2006/096612 | 9/2006 |
| WO | WO-2007/021380 A2 | 2/2007 |
| WO | WO-2007/140429 A2 | 12/2007 |

OTHER PUBLICATIONS

Ray, A., et al., "Complexity-Distortion Analysis of H.264/JVT Decoders on Mobile Devices," Picture Coding Symposium PSC, http://www.egr.msu.edu/waves/people/Radha_files/2004/PSC04.pdf (2004).

Wiegand, T., et al., "Rate-Constrained Coder Control and Comparison of Video Coding Standards," IEEE Transactions on Circuits and Systems for Video Technology, 13(7):688-703 (2003).

Chang et al, "A 7mW-to-183mW Dynamic Quality-Scalable H.264 Video Encoder Chip," Digest of Technical Papers, 2007 IEEE International Solid-State Ciruicts Conference, ISSCC 2007, Feb. 13, 207.

PCT International Search Report, PCT Application No. PCT/US2008/006705, Nov. 28, 2008, 5 pages.

PCT Written Opinion, PCT Application No. PCT/US2008/006705, Nov. 28, 2008, 9 pages.

U.S. Appl. No. 10/423,745, Inventors Stephen Cook et al., filed Apr. 25, 2003.

U.S. Appl. No. 10/651,560, Inventors Lee Hewitt et al., filed Aug. 29, 2003.

U.S. Appl. No. 11/528,432, Inventor Nigel Topham, filed Sep. 28, 2006.

U.S. Appl. No. 11/528,325, Inventors Carl Norman Graham et al., filed Sep. 28, 2006.

U.S. Appl. No. 11/528,338, Inventors Carl Norman Graham et al., filed Sep. 28, 2006.

U.S. Appl. No. 11/528,327, Inventors Carl Norman Graham et al., filed Sep. 28, 2006.

U.S. Appl. No. 11/528,470, Inventors Seow Chuan Lim et al., filed Sep. 28, 2006.

U.S. Appl. No. 11/528,434, Inventors Kar-Lik Wong et al., filed Sep. 28, 2006.

U.S. Appl. No. 11/528,326, Inventors Nigel Topham et al., filed Sep. 28, 2006.

U.S. Appl. No. 60/849,443, Inventors Simon Jones et al., filed Oct. 5, 2006.

\* cited by examiner

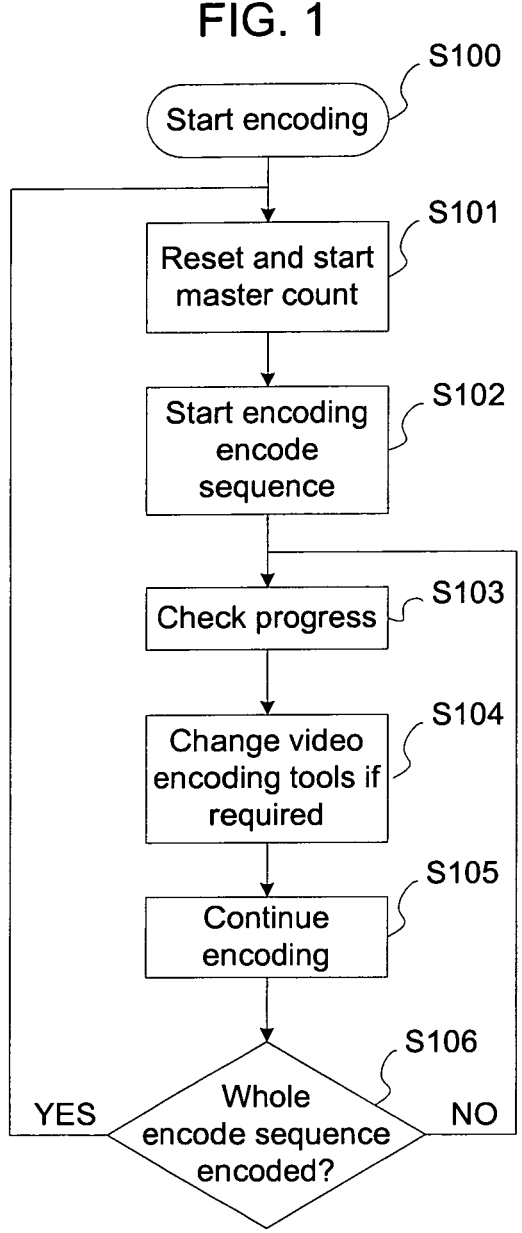

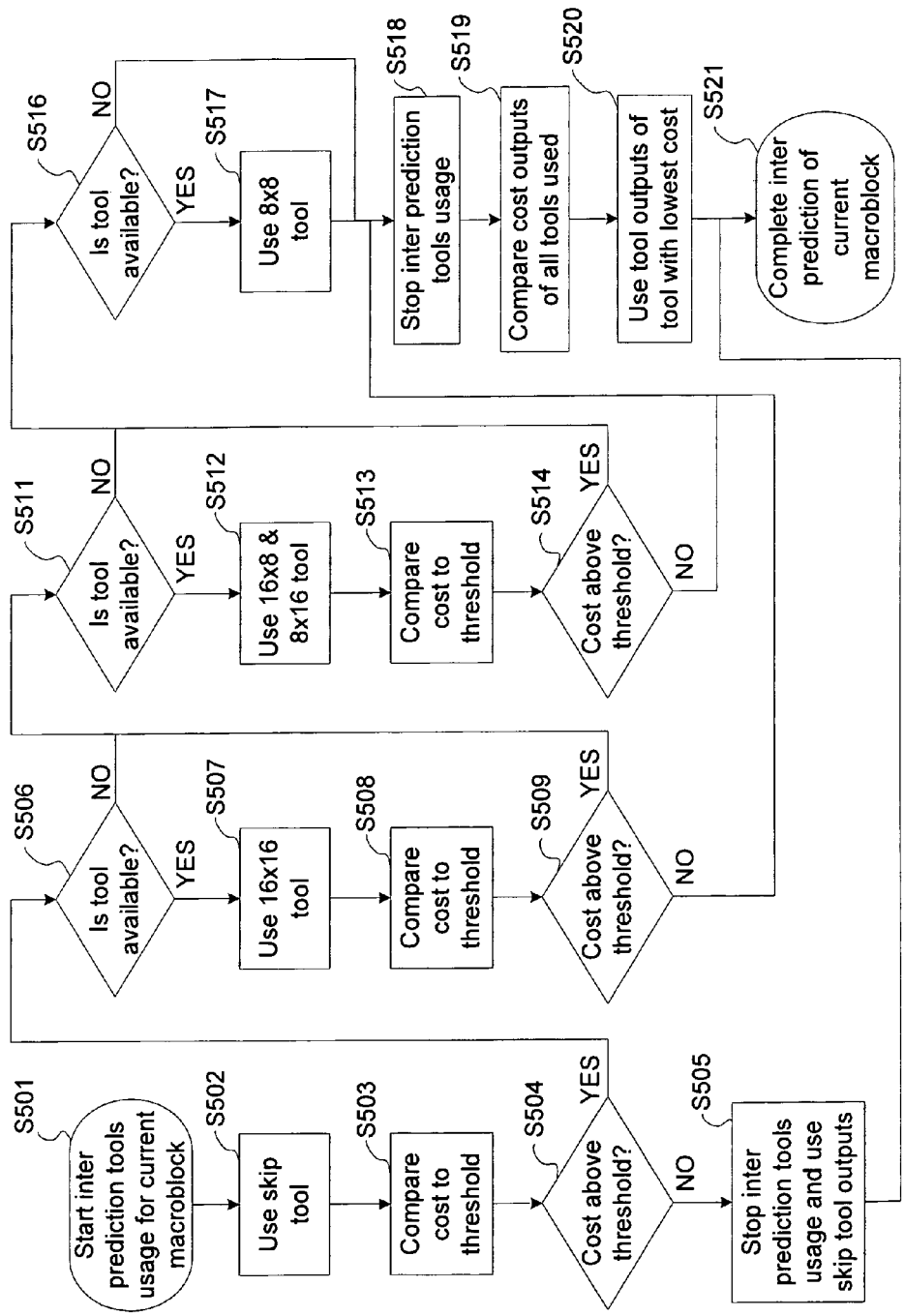

ADAPTIVE VIDEO ENCODING APPARATUS AND METHODS

CROSS-REFERENCE TO RELATED APPLICATIONS

This application claims the benefit under 35 U.S.C. §119 (e) of U.S. Provisional Application No. 60/931,879 filed May 25, 2007, the disclosure of which is hereby incorporated herein by reference in its entirety.

FIELD OF INVENTION

The invention relates in general to video encoding.

BACKGROUND OF THE INVENTION

One important objective of a video encoder is usually to achieve the best picture quality for a target bit-rate and/or the greatest data compression while retaining acceptable picture quality and frame rate. Unencoded (non-compressed) video data comprises data representing every picture element (known as a pixel) in every frame. Video encoders generally utilise blocks of pixels or coefficients that are known as macroblocks that typically comprise 16×16 or 8×8 pixels (but may be smaller, for example 4×4 or 2×2 or rectangular, for example 16×8 or 4×8).

Multi-frame video sequences almost always include data redundancy where much data is repeated or correlated; where pictures, or parts of pictures, remain the same or similar from one frame to another (i.e. where images remain stationary); where there is linear motion; and/or where there are low frequency planar colour areas for example. Rather than send the repeated data, video encoders use a variety of temporal and spatial compression algorithms to compress data that is subsequently sent to video decoders for decompression. Where a picture moves (e.g. via a pan or zoom) or where objects within a picture move (e.g. a moving vehicle), then for each non-stationary macroblock, techniques are used to estimate where the macroblock was positioned in previous frames. Such a technique is known as motion estimation. Video encoders can achieve data compression of moving image portions by, rather than sending the whole pixel data for a macroblock or sub-macroblock, sending a small amount of data that describes an estimated previous location of a macroblock or sub-macroblock (usually known as a motion vector), and a small amount of data representing the difference between the current macroblock and the macroblock at its previous location (the estimated previous location is found using a search algorithm). Persons skilled in the art will know that this data representing the difference is derived from encoding tools. Example encoding tools include inter prediction modes (temporal compression between frames) and intra prediction modes (spatial compression within the current frame).

A video encoder will typically have a number of system resources available to it. Example system resources include: data storage access bandwidth (the rate that the video encoder can access frames of unencoded video data, reference frames, instructions, and general data for example); operating clock frequency; processor time, available processing time; power availability; number of processors (if video encoder forms part of a multi-processor environment); encoded data storage space availability.

One or more system resources may vary at any time during the encoding process, for example: unencoded data storage access bandwidth may reduce when other processes and/or other processors access the data store for purposes other than as part of the video encode process; clock frequency may be reduced if a battery supplying power starts to become exhausted; processor time may reduce if the video encoder processor also has to perform other tasks (such as audio encoding); power availability may reduce when for example a battery supplying power starts to become exhausted; number of processors (if video encoder forms part of a multi-processor environment) may reduce when other processes need to run for purposes other than as part of the video encode process; encoded data storage space may start to become restricted when for example a storage device approaches capacity.

A video encoder will also often have to cater for variations in one or more picture characteristics. Example picture characteristics include: picture content complexity, picture content movement, picture size (number of pixels per frame), data rate requested, and/or frame rate (number of frames per second).

To achieve best encoded picture quality for each encoded macroblock; some video encoders calculate the cost of each of many intra prediction modes and each of many inter prediction modes. The encoder then picks the mode with the lowest cost to derive the data representing the difference between the current macroblock and the macroblock at a previous location or adjacent location (for intra modes). The cost calculation is usually derived from a function of differences of the pixel values, which may be the sum of absolute differences (SAD), mean squared error (MSE) or other function, together with a function of the bit cost. Encoding tools often used in addition, include in loop deblocking filters and sub-pixel motion estimation accuracy. However, this use of every tool for every macroblock can be time consuming needing high processing speeds and consume high amounts of power; this inflexible use of all tools all the time can lead to unnecessary power consumption and hardware cost.

Existing real-time software-based video encoders, that execute on a CPU-based (central processor) platform utilize system resources and cater for or account for certain variations in picture characteristics. In addition, these encoders have a fixed amount of time per macroblock to encode each new frame. Furthermore, existing real-time hardware-based state machine video encoders that operate a sequence of pre-determined encoding operations also utilize system resources in the same manner.

Existing video encoders require that encoding operations have to be designed to cater or account for a set of worst-case system resources, and picture characteristics, for selected usage. Many of the existing encoders are designed to account for either specific changes in system resources, or specific changes in picture quality. The consequences are that improved encoded picture quality is unobtainable when system resources increase, and that if system resources decrease beyond the level designed to be catered for, then the video encoder will run out of time to encode frames, and will have to drop frames leading to visible motion judder or jitter. Similar consequences occur as a result of changes in picture characteristics.

One problem caused by the inflexibility of existing video encoders is that each variation in system resources or picture characteristics requires a different video encoder operating mode. However; this problem requires significant additional overhead within the systems, leading to increased complexity, cost and/or power consumption.

SUMMARY OF THE INVENTION

In one exemplary aspect, the systems and methods described here overcome the inflexibility of existing video encoders by providing best encoded picture quality during any system resource or picture characteristic variations. This is achieved by checking encoding progress regularly throughout an encode sequence, including checking encoding progress within a macroblock or intra-macroblock, and automatically adapting the encoder's use of encoding tools according to actual achieved encoding progress. In this way, no specific knowledge of, or measurement of, changes in system resources or picture characteristics is required.

In one exemplary aspect, the systems and methods presented herein comprise an adaptive real-time video encoder. In one embodiment, the video encoder automatically adapts encoding picture quality in response to any changes in prevailing circumstances. Such changes in prevailing circumstances include for instance changes in system resources and changes in picture characteristics, examples of which are described herein above.

In one exemplary aspect, the systems and methods presented herein sequentially check whether each encoding tool meets a predetermined threshold and if the requirement is met, then does not utilize other tools available. This leads to reduced encoding time and reduced power consumption when compared to other methods that always use all tools and then pick the best one.

The exemplary video encoder has available to it a wide range of encoding tools. Some of these tools may be used to process the video frames, or macroblocks within the video frames, or even portions within the macroblocks (intra-macroblock video encoding tools). In one embodiment, the video encoder operates to encode an encode sequence comprising one or more macroblocks in an encode time interval, where the encode time interval may comprise for example one second or one thirtieth of a second (where the frame rate is 30 frames per second for example). The video encoder starts a real-time counter when it begins to encode for a new time interval and may start encoding using all encoding tools (to achieve the highest picture quality). The video encoder checks encode progress by, at particular points, comparing actual number of macroblocks encoded with the number of macroblocks that should have been encoded and/or the video encoder may check encode progress by comparing actual number of frames encoded with the number of frames that should have been encoded. At these encode check progress points, if more time has elapsed than should have per macroblock, then a restricted range of tools are used for subsequent macroblock encoding (until the next check progress point is reached); the time taken to encode some macroblocks may be more than a single macroblock's time, and to compensate, other macroblocks are encoded using less than a single macroblock-time. In this way, the heterogenous circuitry of tools align to ordered operations to achieve graceful gradual picture quality reduction within a macroblock or intra-macroblock, if for example system resources reduce during the macroblock encode time interval. Such encoding significantly speeds up encoding time while maintaining high picture quality. A worst-case situation can occur if for example system resources reduce significantly near the end of an encode time interval and in such a case the video encoder can resort to dropping frames. As mentioned above, the video encoder may additionally or alternatively monitor encode progress at the end of a frame, or after a certain number of frames have been encoded, and adapt the use of tools in a similar manner. Example video encoding tools known to persons skilled in the art include without limitation motion estimation search algorithm variants, macroblock and sub-macroblock size variations, intra prediction modes, inter prediction modes, in-loop or out-of-loop deblocking variations, sub-pixel interpolation variations and image pre-compression pre-processing algorithms such as low pass filters. Some of these tools may be used to process the video frames, or macroblocks within the video frames, or even portions within the macroblocks (intra-macroblock video encoding tools e.g. sub-macroblock or macroblock variants).

The video encoder of the exemplary embodiment may use the following preferred algorithm for tools selection comprising the analysis of three progress measurement values to determine an overall progress value. The overall progress value is used to select an appropriate set of tools (the set of tools may be more or less restricted than the set of tools previously used). The first progress measurement value is determined from the difference (from the start of the frame) between how much time should have been used to reach the current check progress point and how much time was actually used to reach the current point. The second progress measurement value is determined from the difference (from the last check progress point) between how much time should have been used to reach the current check progress point and how much time was actually used to reach the current point. The third progress measurement value is determined from the distance between the current macroblock and the end of the current frame (i.e. how many macroblocks need to be encoded to complete the frame). Persons skilled in the art will know that the overall progress value may be determined by using alternative and/or additional progress measurement values, for example an additional or alternative progress measurement value could be determined from the difference (from the start of the encode sequence) between how much time should have been used to reach the current check progress point and how much time was actually used to reach the current point.

The video encoder of the exemplary embodiments may use an alternative tools select algorithm comprising one or more look-up tables. For each table, every table entry comprises a list of encoding tools. Table entries occur corresponding to variations in average encode time per frame. In this way, when the average encode time per frame exceeds the real time per frame, corresponding table entries may contain a restricted list of tools; thereby providing the video encoder with a mechanism to reduce the frame encode time for subsequent frames. At the points where the video encoder monitors encode progress, the average encode time per frame is calculated and the corresponding table entry is read to see what tools are to be used until the next time encoding progress is checked. In a similar manner, tables may be used to enable or restrict tools usage for encoding macroblocks within frames by monitoring average time to encode macroblocks.

Another aspect of the systems and methods presented herein relate to a real-time video encoder that adapts its video encoding algorithm in response to changes in any one or more system resource and/or changes in any one or more picture characteristic.

A third aspect of the systems and methods presented herein relate to a real-time video encoder that adapts video encoding tools use in response to measured encoding progress.

A fourth aspect of the systems and methods presented herein relate to a real-time video encoder that uses a tools select algorithm comprising combining progress measurement values to determine an overall progress value the overall progress value is used to select an appropriate set of tools.

A fifth aspect of the systems and methods presented herein relate to a real-time video encoder that uses a tools select algorithm comprising one or more look-up tables, where for each table, every table entry comprises a list of encoding tools, table entries occur corresponding to variations in average encode time per frame.

A sixth aspect of the systems and methods presented herein relate to a real-time video encoder that has a sequential and selective use of inter prediction tools. Such selective use includes a reduction in the type of intra prediction modes tested and/or disabling an in-loop deblocking filter.

A tenth aspect of the invention relates to a digital processor configured to encode data using one of the aforementioned adaptive encoding schemes. In one embodiment, the digital processor comprises a RISC device fabricated as an integrated circuit (IC). In one variant, the integrated circuit comprises a design generated by a user-configuration and extension design process running on a computer, which generates a description language model (e.g., Verilog®, VHDL, Systems C, Java®, CAS, ISS, or any other programming language-based representation of the design, as appropriate.) of the processor design useful for subsequent synthesis, simulation, and fabrication. The IEEE Std. 1076.3-1997, IEEE Standard VHDL Synthesis Packages, incorporated herein by reference in its entirety, describes an industry-accepted language for specifying a Hardware Definition Language (HDL) based design and the synthesis capabilities that may be expected to be available to one of ordinary skill in the art.

In one such variant, the design comprises a "soft" processor core that is both user-configurable and extendable at time of IC design, and comprises a mixed length instruction set architecture.

An eleventh aspect of the invention comprises a method of adaptively encoding data.

A twelfth aspect of the invention comprises a video or other data aggregation or structure (e.g., file, real-time stream, etc.) which is adaptively encoded according to one or more of the foregoing method(s).

A thirteenth aspect of the invention comprises a mobile device utilizing the aforementioned integrated circuit with adaptive encoder. In one variant, the mobile device comprises a personal media device (e.g., LG Chocolate™, Apple iPod™, etc.) adapted to display video. In another variant, the mobile device comprises a laptop computer. In yet another variant, the mobile device comprises a cellular telephone (e.g., 3G smartphone, etc.).

Embodiments and applications are described by way of example only and persons skilled in the art will know that there are many alternative ways to embody the systems and methods presented herein and many alternative ways to apply these systems and methods.

BRIEF DESCRIPTION OF DRAWINGS

The systems and methods described herein may be better understood from the following illustrative description with reference to the following drawings, in which:

FIG. 1 is a flow chart describing the operation of an example real-time video encoder according to an aspect of the current invention;

FIG. 4 is a flow chart describing the operation of an example sequential and selective use of inter prediction tools according to an aspect of the current invention.

DETAILED DESCRIPTION

Figure 2A:
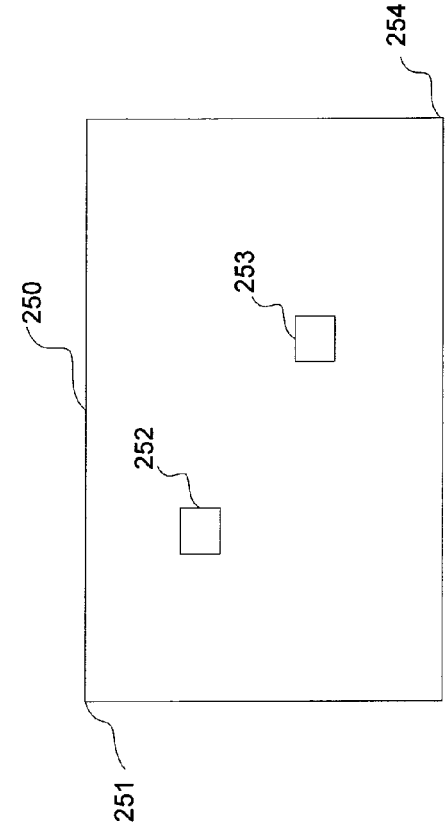
FIG. 2a shows an example video frame with example macroblock check progress points.

To provide an overall understanding of the systems and methods described herein, certain illustrative embodiments will now be described. However, it will be understood by one of ordinary skill in the art that the methods described herein may be adapted and modified as is appropriate for the application being addressed and that the systems and methods described herein may be employed in other suitable applications, and that such other additions and modifications will not depart from the scope hereof.

FIG. 1 is a flow chart describing the operation of an example real-time video encoder according to an aspect of the current invention. Unencoded video is stored in real-time in a data store (not shown). The video encoder has access to the data store. An encode sequence comprises a plurality of macroblocks. Such an encode sequence may comprise part of a frame, a complete frame, or a plurality of frames (or any combination of complete or part frames). The frame time or duration will be defined by the incoming video frame rate (an example commonly-used frame rate is 30 frames per second and for this frame rate the frame time is one thirtieth of a second ($\frac{1}{30}$ second)). The block time used in this example is equal to (frame time)/(number of macroblocks in a frame), although it will be appreciated that other time/encoding schemes may be employed consistent with the invention.

The example encoder may use a variable amount of time to encode each macroblock; some macroblocks may take more than one block time and some macroblocks may take less than one block time, provided that the total amount of time taken to encode the encode sequence is less than or equal to (block time)*(number of macroblocks in the encode sequence). Similarly, the encoder may use a variable amount of time to encode each frame; some frames may take more than one frame time and some frames may take less than one frame time; provided that the total amount of time taken to encode the encode sequence is less than or equal to (frame time)*(number of frames in the encode sequence). The encoder starts encoding at step S100. At step S101 a master count is reset and started and then the master count is incremented each time a real-time counter increments; in this way, the master count keeps track of time passing. At step S102 the video encoder starts encoding an encode sequence using a set of video encoding tools. At step S103 the video encoder checks encoding progress if a check progress point is reached. Progress is checked using the master count. For example, if one frame has been encoded and the master count is at a time of more than one frame time, then the video encoder will know that it is taking too much time to encode a frame. Check progress points may be at various positions within a frame, at the end of a single frame and/or at the end of a number of frames for example. There may a plurality of check progress points within a frame. At step S104 the encoder may change the video encoding tools. Video encoding tools will be known to persons skilled in the art and may include one or more of inter prediction, intra prediction, in-loop or out-of-loop deblocking filter, sub-pixel interpolation, motion estimation algorithm variations and/or any others as described herein. Video encoding tools may be used in any combination and/or in any variation as described herein and/or as known to persons skilled in the art.

The video encoder (at step S103) may find that encoding progress is worse than average; i.e. if the average time to encode a frame is more than the frame time or if the average time to encode a macroblock is more than the block time. If the video encoder (at step S103) does find that encoding progress is worse than average, then (at step S104) it may move to a more restrictive set of encoding tools, where such a set of restrictive encoding tools will take less time to encode each subsequent frame or macroblock. Conversely, if the video encoder (at step S103) finds that encoding progress is better than average, then the video encoder (at step S104) may move to a less restrictive set of encoding tools (if available). As the video encoding tools being used become more restrictive, the encoded picture quality will reduce and in this manner the video encoder automatically dynamically adapts so as to gracefully degrade the encoded picture quality (and as a last resort, if encoding time reduces too much, then the video encoder may drop frames altogether). Encoding progress may change as changes occur in any one or more of system resources and/or picture characteristics, examples of which are described herein above.

At step S105 the video encoder continues the encoding process for the current encode sequence using the video encoding tools set at step S104. The encoding process will continue until the next check progress point is reached. The next check progress point may be a distance ahead of, for example: a number of macroblocks within the current frame, a frame, or a number of frames.

At step S106 the video encoder checks to see if the whole of the current encode sequence has been encoded; if it has, then the video encoder jumps to step S101 to start the encoding process for the next sequential encode sequence. If at step S106 the video encoder determines that the current encode sequence has not all been encoded, then it jumps to step S103. The video encoder will continue real-time encoding until the encoding process is halted, by for example, user intervention or incoming video ceasing. Persons skilled in the art will know that there are many ways that the encoding process may be halted, which will include signals from another part of a larger apparatus, device or system (not shown). During the encoding process, encoded video data may be stored and/or output for example. If encoded video data is output from the video encoder as it is encoded, it may be communicated for use by another part of a larger apparatus (not shown) or another apparatus (not shown). Encoded and then decoded video data may be stored in memory for use as reference data as part of the encoding process. If encoded video data from the video encoder is stored, it may be stored for later use, for example, on fixed or removable media such as hard disc drive or DVD (digital versatile disc). Persons skilled in the art will know that video encoders typically encode a frame (FIG. 2a) by encoding one macroblock after another along horizontal rows starting at the top left and completing the frame at the bottom right, although other schemes may be used consistent with the present invention.

FIG. 2a shows an example video frame with example macroblock check progress points to illustrate a preferred example algorithm to change encoding tools according to an aspect of the present invention. When the video encoder determines that the next check progress point has been reached and therefore needs to determine encoding progress (at step S103 in FIG. 1 for example), the algorithm to change encoding tools determines an overall progress value. The overall progress value is used to select an appropriate set of tools where the set of tools may be more or less restricted than the set of tools previously used (an example of where tools may be changed is at step S104 in FIG. 1). The overall progress value is determined from one or more progress measurement values and a preferred embodiment of the algorithm uses three measurement values. Example check progress points are represented by macroblocks at progress points 252 and 253 within frame 250 (these are shown at arbitrary positions along their macroblock rows, but may preferably be located at the beginning or end of their row). For this example explanation, consider the case where the video encoder has reached check progress point 253 and that the previous check progress point was at 252. The first progress measurement value is determined from the difference (from the start of the frame 251) between how much time should have been used to reach the current check progress point 253 and how much time was actually used to reach the current point. The time that should have been used from start of frame is equal to (number of macroblocks encoded in the frame so far)*(block time). The time actually used is determined from the master count. The sign of the difference indicates whether encoding progress is ahead of or behind time (i.e. whether there is spare time that can be used for more complex encoding of future macroblocks, or whether there is a time deficit which would indicate that simpler encoding would be required for future macroblocks). The second progress measurement value is similarly determined, but in this case from the last check progress point; so the value is determined from the difference between how much time should have been taken between points 252 to 253 and how much time was actually taken.

The third progress measurement value is determined from the distance between the current macroblock 253 and the end of the current frame 254 (i.e. how many macroblocks need to be encoded to complete the frame). Persons skilled in the art will know that the overall progress value may be determined by using fewer, alternative and/or additional progress measurement values, for example an additional or alternative progress measurement value could be determined from the difference (from the start of the encode sequence) between how much time should have been used to reach the current check progress point and how much time was actually used to reach the current point.

Persons skilled in the art will know that if check progress points occur at the end of frames of a multi-frame sequence, then the overall progress value at each point could be similarly determined from one or more progress measurement values. For example a first progress measurement value could be determined from the difference (from the start of the encode time interval) between how much time should have been used to reach the current check progress point and how much time was actually taken. Similarly, for example a second progress measurement value could be determined from the difference between how much time should have been taken between the end of the previous frame and how much time was actually taken. Again, similarly, a third progress measurement value could be determined from the number of remaining frames in the multi-frame sequence (the encode time interval).

Figure 2B:
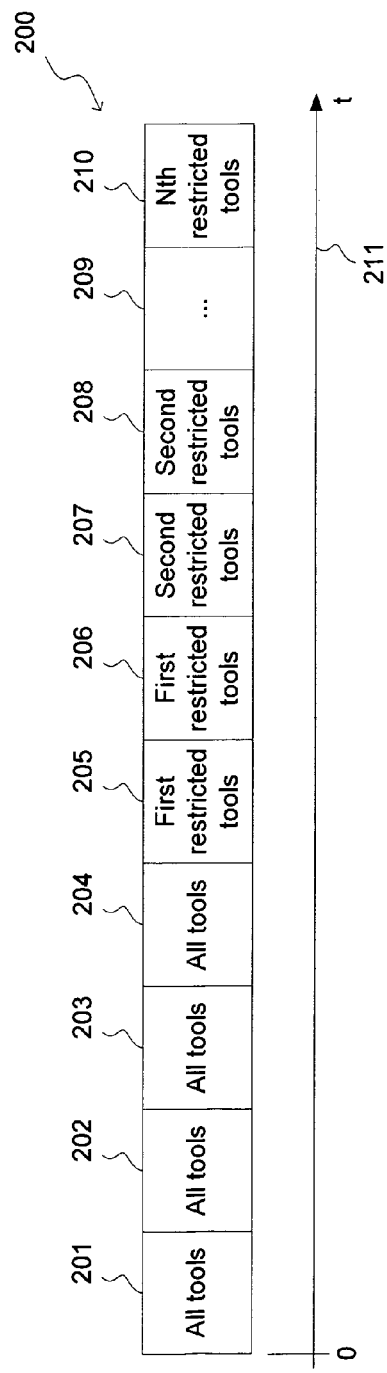
FIG. 2b shows an example method that may be used to change encoding tools according to an aspect of the systems and methods presented herein comprising a lookup-table.

FIG. 2b shows a further example method according to an aspect of the systems and methods presented herein that may be used to change encoding tools comprising a lookup-table 200. Look-up table 200 comprises table-cells 201 to 210, and may comprise any number of cells (fewer or greater) as indicated by cell 209. Each cell's contents describe the video encoding tools to be used if that cell is selected. When encoding tools may be changed (at step S104 in FIG. 1 for example), a cell is selected according to video encoding progress (as determined by for example step S103 in FIG. 1), where such progress is measured as an average time to encode a frame, indicated by the time-line 211 (if macroblock encoding progress is being measured, then the average time to encode a frame may be calculated to be =(the average time to encode a macroblock)*(the number of macroblocks in a frame)). If the average time to encode a frame is less than the frame time, then all tools may be selected in order to maintain maximum encoded picture quality (cells 201 to 204 for example). If however, the average time to encode a frame increases above the frame time (at cells 205 and 206 for example), then a group of first restricted encoding tools may be selected. If, at subsequent video encode progress checking, the average time to encode a frame continues to increase further above the frame time, then more and more restrictive tools groups may be selected (for example cells 207 to 210) in order to gradually decrease encoded picture quality and ideally enable encoding of all frames within the current batch encode sequence.

With regard to tools selection algorithms or methods as described for example in FIGS. 2a and/or 2b, restricted tools may be formed by the removal or modified use of any available tools or tools algorithms as described herein.

The way that the overall progress value may be determined from progress measurement values and/or the way that the overall progress value may be used to select different encoding tools and/or the way look up table cell contents may be determined, changed or adapted may be derived from the use of any one or more, in any combination, of: trial and error; iterative change; algorithmic adaptation; auto adaptation relating to test video sequences for example. Persons skilled in the art will know that other methods may be used in combination with or instead of any of these examples.

Algorithms to derive overall progress values and/or look up tables as described herein are example methods of enabling video tools changes (as per step S104 in FIG. 1); however, persons skilled in the art will know that other methods are possible. Such other methods may include statistical methods or other non-statistically based methods for decision-making and optimisation, which may include any one or more of linear programming techniques, quadratic programming, dynamic programming, queuing theory, fuzzy logic or artificial neural networks.

Figure 3:
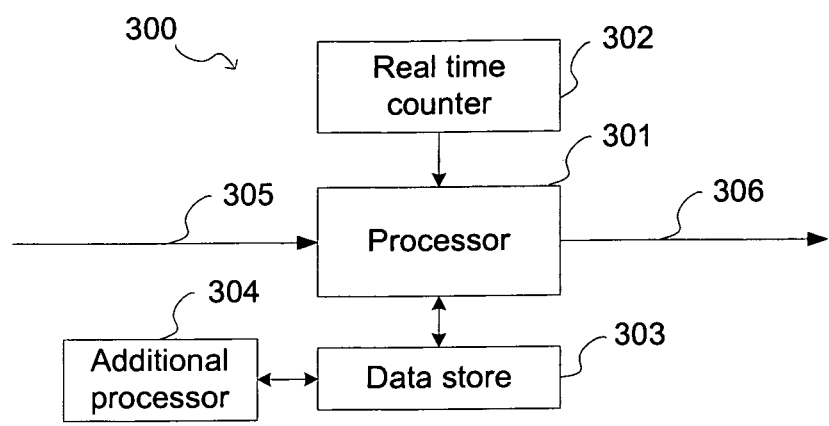
FIG. 3 is a block diagram that shows an example adaptive video encoder according to an aspect of the current invention.

FIG. 3 is a block diagram that shows an example video encoder 300 according to an aspect of the current invention. The video encoder comprises processor 301, real time counter 302 and data store 303. One or more additional processor 304 may or may not be present if the video encoder forms part of a larger device or system (not shown). Processor 301 may run a program or algorithm to carry out the video encoding as described for FIG. 1, FIG. 2a and/or FIG. 2b (if the adaptive video encoder forms part of a larger device or system, processor 301 may perform tasks additional to encoding video). Processor 301 includes all elements necessary for the adaptive video encoder to function stand-alone or as part of a larger device or system, and persons skilled in the art will know that examples of such elements include program memory, data memory, input-output interfaces, device driver or controller interfaces and/or interprocessor communications interfaces. Real time counter 302 communicates with processor 301 to provide a measure of elapsed time. When video encoder 300 is carrying out video encoding as described for FIG. 1, the real time counter is reset and restarted at step S101 (FIG. 1) and its measure of elapsed time is used at step S103 (FIG. 1). Real time unencoded video data is input to processor 301 via signals 305 (alternatively, unencoded video data 305 may be stored directly into data store 303 by the use of a direct memory access function, which is not shown for clarity). Real time unencoded video data may be sourced from a camera, film scanner, or studio feed for example, and persons skilled in the art will know of other possible sources. Processor 301 communicates with data store 303 to store and/or retrieve video data. Processor 301 outputs encoded video data via signals 306 and/or may store the encoded video data in data store 303. Output video data may for example be communicated to recordable disc, magnetic tape, or a transmission channel, and persons skilled in the art will know that many other destinations may be beneficially utilised. Persons skilled in the art will know that processor 301 and additional processor 304 may communicate with data store 303 via separate signals or busses as shown and/or may communicate directly via a single signal bus and/or any other processor communication technique and/or any other data communication technique. Processor 301 may comprise one or more processor where each of one or more processor may comprise any one of RISC (reduced instruction set computer), CISC (complex instruction set computer), DSP (digital signal processor), CPU (central processing unit), microprocessor, microcontroller, co-processor, hardware logic or state machine for example.

Processor 301 may be any integrated circuit or other electronic device (or collection of devices) capable of performing an operation on at least one instruction word including, without limitation, reduced instruction set core (RISC) processors such as for example the ARC family of user-configurable cores provided by the Assignee hereof, central processing units (CPUs), ASICs, and digital signal processors (DSPs). The hardware of such devices may be integrated onto a single substrate (e.g., silicon "die"), or distributed among two or more substrates. Furthermore, various functional aspects of the processor may be implemented solely as software or firmware associated with the processor. Additionally, the processor may have extensions which may include an extension instruction (whether predetermined according to a template, or custom generated/configured by the designer) such as rotate, arithmetic and logical shifts within a barrel shifter, MAC functions, swap functions (for swapping upper and lower bytes, such as for Endianess), timer interrupt, sleep, FFT, CMUL, CMAC, XMAC, IPSec, Viterbi butterfly, and the like. Extensions may also include features or components such as multiplier/arithmetic units, functional units, memory, scoreboards, and any number of other features over which a designer may desire to exert design control.

Processor 301 may comprise functionality in any combination of software or hardware on one or more integrated circuits. Such software may include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.), Binary Runtime Environment (e.g., BREW), and the like.

Data store 303 may comprise any combination of DRAM (dynamic random access memory), SRAM (static random access memory), MRAM (magnetic random access memory), EEPROM (electrically erasable programmable read only memory), optical media or magnetic media for example. Data store 303 may be any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM. Processor 301 may in addition to video encoding, carry out tasks such as hard disc control, operating system control and/or user interface control for example.

FIG. 4 is a flow chart describing the operation of an example sequential and selective use of inter prediction tools according to an aspect of the current invention. Such a sequential and selective use of inter prediction tools may be used within any video encoder described herein and persons skilled in will know that such a use may also be used with any other block-based video encoding algorithm. Such a use of inter prediction tools enables reduced encoding time and reduced power consumption when compared to other methods that always use all tools and then pick the best one.

In general, for the sequential and selective use of inter prediction tools shown in FIG. 4, a tool is used and the tool typically outputs a cost and a motion vector. The cost is compared to a threshold and if lower than the threshold, that tool's outputs may be used to code the current macroblock. If the cost is higher than the threshold, then the next available tool is used and so on. These cost thresholds and tool availabilities are set whenever a video encoder changes encoding tools. A particular set of restrictive tools may have one or more tools set to be unavailable and particular cost thresholds will be set for the remaining tools. This selection of restrictive tools may be done, for example, at step S104 (FIG. 1) and may for example be set due to the operation of the algorithm as described for FIG. 2a and/or due to selection of a table cell (205-210, FIG. 2b). If all tools are selected at S104 (FIG. 1) and/or during the operation of the algorithm as described for FIG. 2a and/or 201-204 (FIG. 2b) then all inter prediction tools will be made available and appropriate cost thresholds will be set for each tool.

FIG. 4 shows the use of four inter prediction tools; however, more or fewer tools could be used and/or tools could be used in a different order; for example, additional tools for 4×4 or even smaller may be used.

Each tool will take a different amount of time to provide its cost and motion vector outputs; for example, a 16×16 tool may take more than six times as much time as a skip tool, an 8×8 tool may take about 50% more time than a 16×16 tool, and a 16×8 & 8×16 tool may take about twice the time an 8×8 tool takes. It is therefore clear that there are significant benefits of not using tools if they are not required.

Referring now to the flow chart; at step S501 the video encoder starts the inter prediction tools usage for the current macroblock encode. At step S502 the skip tool is used (this tool will look for an identical match to a macroblock a short distance away or in the same spatial position in other frames and when it outputs its cost level, the cost level is compared to the stored skip threshold at step S503. At step S504 if the cost is above the threshold, the path to step S506 is taken, but if below the threshold, at step S505 the video encoder stops further inter prediction tools use and uses the skip tool outputs (cost and motion vector) to encode the current macroblock; (at step S521 the video encoder completes the inter prediction of the current macroblock).

At step S506, if the 16×16 tool is available (i.e. it has been set to be available during selection), then the video encoder uses the 16×16 tool; but if the tool is not available, then the video encoder checks the next tool at step S511. In some embodiments, it may be advantageous to always make the 16×16 tool available. If the 16×16 tool is used at step S507, then when it outputs its cost and motion vector, the cost is compared to the stored threshold at step S508. At step S509 if the cost is above the threshold, the path to step S511 is taken, but if below the threshold, the path to step S518 is taken (the path from step S518 is described below).

Then in a similar manner to the process described for step S506, at step S511, if the 16×8 & 8×16 tool is available, then it is used; but if not available, then the 8×8 tool branch is taken at step S516. If the 16×8 & 8×16 tool is used at step S512, then when it outputs its cost and motion vector, the cost is compared to the stored threshold at step S513. At step S514 if the cost is above the threshold, the path to step S516 is taken, but if below the threshold, the path to step S518 is taken (the path from step S518 is described below).

If a path to step S516 is taken and the 8×8 tool is available, then the video encoder uses the 8×8 tool at step S517, then at step S518 the video encoder stops the use of inter prediction tools for the current macroblock. At step S519 the video encoder compares all of the cost outputs from all of the tools used for the current macroblock; which in the example of FIG. 4, could be costs from one, two, three or four tools. At step S520 the video encoder chooses the tool outputs from the tool that provided the lowest cost. Then at step S521 the video encoder completes the inter prediction of the current macroblock.

At this stage the video encoder may compare the best candidate inter prediction (as discovered during the process described for FIG. 4) with the best candidate intra prediction (the intra prediction process may be carried out in parallel to the inter prediction process). Then the video encoder may select the macroblock coding type according to costs (and/or other characteristics) of the inter and intra prediction processes. When the video encoder completes the encoding of the current macroblock, the process is started again for the next macroblock (if the video encoder reaches a change tools point between encoding the macroblocks, then it may change the available tools and/or change the stored thresholds, before starting the next macroblock encode sequence).

Referring again to FIG. 4; tools using sub-macroblock partitions (e.g. the 16×8 & 8×16 tool and the 8×8 tool) may output more than one cost and more than one motion vector; for example, as persons skilled in the art will know, the 8×8 tool comprises four 8×8 pixel blocks within a 16×16 macroblock. The video encoder may (in the example of the 8×8 tool) use: the lowest of the four costs; an average of the four costs and/or another method to derive a single cost for the tool, for use in comparisons with costs from other tools.

Integrated Circuit Design and Device

The Assignee's ARC processor core (e.g., ARC 600 and ARC 700) configuration is used as the basis for one embodiment of an integrated circuit (IC) device employing certain exemplary aspects and features of the adaptive encoding invention(s) described herein; however, other arrangements and configurations may be substituted if desired. The exemplary device is fabricated using e.g., the customized VHDL design obtained using techniques such as those described in U.S. Pat. No. 6,862,563 to Hakewill, et al. issued Mar. 1, 2005 entitled "METHOD AND APPARATUS FOR MANAGING THE CONFIGURATION AND FUNCTIONALITY OF A SEMICONDUCTOR DESIGN", U.S. patent application Ser. No. 10/423,745 filed Apr. 25, 2003 entitled "APPARATUS AND METHOD FOR MANAGING INTEGRATED CIRCUIT DESIGNS", and/or U.S. patent application Ser. No. 10/651,560 filed Aug. 29, 2003 and entitled "COMPUTERIZED EXTENSION APPARATUS AND METHODS", each of the foregoing incorporated herein by reference in its entirety, which is then synthesized into a logic level representation, and then reduced to a physical device using compilation, layout and fabrication techniques well known in the semiconductor arts. For example, the systems and methods presented herein are compatible with e.g., 0.13, 0.1 micron, 78 nm, and 50 nm processes, and ultimately may be applied to processes of even smaller or other resolution.

It will be recognized by one skilled in the art that the IC device of the systems and methods presented herein may also contain any commonly available peripheral such as serial communications devices, parallel ports, timers, counters, high current drivers, analog to digital (A/D) converters, digital to analog converters (D/A), interrupt processors, LCD drivers, memories and memory interfaces, network interfaces, wireless transceivers, and other similar devices. Examples of mobile or portable devices include, but are not limited to, personal digital assistants (PDAs) such as the Blackberry or "Palm®" families of devices, handheld computers, personal communicators, personal media devices (such as e.g., the Apple iPod® or LG Chocolate), J2ME equipped devices, cellular telephones, "SIP" phones, gaming devices, personal computers (PCs) and minicomputers, whether desktop, laptop, or otherwise. Network interfaces may include any any signal, data, or software interface with a component, network or process including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), WiFi (802.11a,b,g,n), WiMAX (802.16), PAN (802.15), or IrDA families. The wireless transceiver may use any wireless signal, data, communication, or other interface including, without limitation, WiFi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Further, the processor may also include other custom or application specific circuitry, such as to form a system on a chip (SoC) device useful for providing a number of different functionalities in a single package as previously referenced herein. The systems and methods presented herein are not limited to the type, number or complexity of peripherals and other circuitry that may be combined using the method and apparatus. Rather, any limitations are primarily imposed by the physical capacity of the extant semiconductor processes which improve over time. Therefore it is anticipated that the complexity and degree of integration possible employing the systems and methods presented herein will further increase as semiconductor processes improve.

In one exemplary embodiment, the processor design of the systems and methods presented herein utilize the ARCompact™ ISA of the Assignee hereof. The ARCompact ISA is described in greater detail in published U.S. Patent Application No. US 20030225998 entitled "CONFIGURABLE DATA PROCESSOR WITH MULTI-LENGTH INSTRUCTION SET ARCHITECTURE" filed Jan. 31, 2003, assigned to the Assignee hereof, and incorporated by reference herein in its entirety. The ARCompact ISA comprises an instruction set architecture (ISA) that allows designers to freely mix 16- and 32-bit instructions on its 32-bit user-configurable processor. A key benefit of the ISA is the ability to cut memory requirements on a SoC (system-on-chip) by significant percentages, resulting in lower power consumption and lower cost devices in deeply embedded applications such as wireless communications and high volume consumer electronics products.

The main features of the ARCompact ISA include 32-bit instructions aimed at providing better code density, a set of 16-bit instructions for the most commonly used operations, and freeform mixing of 16- and 32-bit instructions without a mode switch—significant because it reduces the complexity of compiler usage compared to competing mode-switching architectures. The ARCompact instruction set expands the number of custom extension instructions that users can add to the base-case ARC™ processor instruction set. With the ARCompact ISA, users can add literally hundreds of new instructions. Users can also add new core registers, auxiliary registers, and condition codes. The ARCompact ISA thus maintains and expands the user-customizable and extensible features of ARC's extensible processor technology.

The ARCompact ISA delivers high density code helping to significantly reduce the memory required for the embedded application. In addition, by fitting code into a smaller memory area, the processor potentially has to make fewer memory accesses. This can cut power consumption and extend battery life for portable devices such as MP3 players, digital cameras and wireless handsets. Additionally, the shorter instructions can improve system throughput by executing in a single clock cycle some operations previously requiring two or more instructions. This can boost application performance without having to run the processor at higher clock frequencies. When combined with the enhanced throughput and efficiency features of the systems and methods presented herein related to inter alia the DMA assist, the ARCompact ISA provides yet further benefits in terms of reduced memory requirements and efficiency.

In addition to the foregoing, the adaptive encoding technology and integrated circuit device of the systems and methods presented herein may be combined with other technologies that enhance one or more aspects of its operation, code density, spatial density/gate count, power consumption, etc., or so as to achieve a particular capability or functionality. For example, the technologies described in co-owned and co-pending U.S. patent application Ser. No. 11/528,432 filed Sep. 28, 2006 entitled "SYSTOLIC-ARRAY BASED SYSTEMS AND METHODS FOR PERFORMING BLOCK MATCHING IN MOTION COMPENSATION"; U.S. patent application Ser. No. 11/528,325 filed Sep. 28, 2006 entitled "SYSTEMS AND METHODS FOR ACCELERATING SUB-PIXEL INTERPOLATION IN VIDEO PROCESSING APPLICATIONS"; U.S. patent application Ser. No. 11/528,338 filed Sep. 28, 2006 entitled "SYSTEMS AND METHODS FOR RECORDING INSTRUCTION SEQUENCES IN A MICROPROCESSOR HAVING A DYNAMICALLY DECOUPLEABLE EXTENDED INSTRUCTION PIPELINE"; U.S. patent application Ser. No. 11/528,327 filed Sep. 28, 2006 entitled "SYSTEMS AND METHODS FOR PERFORMING DEBLOCKING IN MICROPROCESSOR-BASED VIDEO CODEC APPLICATIONS"; U.S. patent application Ser. No. 11/528,470 filed Sep. 28, 2006 entitled "SYSTEMS AND METHODS FOR SYNCHRONIZING MULTIPLE PROCESSING ENGINES OF A MICROPROCESSOR"; U.S. patent application Ser. No. 11/528,434 filed Sep. 28, 2006 entitled "SYSTEMS AND METHODS FOR SELECTIVELY DECOUPLING A PARALLEL EXTENDED INSTRUCTION PIPELINE"; U.S. patent application Ser. No. 11/528,326 filed Sep. 28, 2006 entitled "PARAMETERIZABLE CLIP INSTRUCTION AND METHOD OF PERFORMING A CLIP OPERATION USING SAME"; and U.S. patent application Ser. No. 60/849,443 filed Oct. 5, 2006 and entitled "INTERPROCESSOR COMMUNICATION METHOD", each of the foregoing incorporated herein by reference in its entirety, may be used consistent with technology described herein.

The integrated circuits described herein may be any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

The embodiments of the systems and methods presented herein are not to be limited in scope by the specific embodiments described herein. For example, although many of the embodiments disclosed herein have been described with reference to systems and methods for microprocessor architecture, the principles herein are equally applicable to other aspects of microprocessor design and function. Indeed, various modifications of the embodiments of the present inventions, in addition to those described herein, will be apparent to those of ordinary skill in the art from the foregoing description and accompanying drawings.

Further, although some of the embodiments of the systems and methods presented herein have been described herein in the context of a particular implementation in a particular environment for a particular purpose, those of ordinary skill in the art will recognize that its usefulness is not limited thereto and that the embodiments of the systems and methods presented herein can be beneficially implemented in any number of environments for any number of purposes.

What is claimed is:

1. An adaptive video encoder, comprising:
   a counter configured to measure an elapsed length of time for encoding a first sequence of macroblocks of a frame comprising an initial macroblock of the frame, a check progress macroblock, and macroblocks between the initial macroblock and the check progress macroblock, the check progress macroblock placed between the initial macroblock and a final macroblock of the frame; and
   a processor configured to:
      encode the first sequence of macroblocks using a first set of video encoding tools, each video encoding tool implementing a video processing algorithm;
      determine whether the measured elapsed time is shorter than or equal to a predetermined time, the predetermined time representing an expected elapsed time for encoding the first sequence of macroblocks;
      responsive to determining that the measured elapsed time is shorter than or equal to the predetermined time, use the first set of video encoding tools for encoding a second sequence of macroblocks of the frame subsequent to the first sequence of macroblocks; and
      responsive to determining that the measured elapsed time is longer than the predetermined time, use a second set of video encoding tools for encoding the second sequence of macroblocks of the frame, the second set of video encoding tools implementing at least one video processing algorithm different from the first set of video tools.

2. The adaptive video encoder of claim 1, wherein the processor comprises a user-configured and extended processor core having a mixed-length instruction set architecture comprising 16-bit and 32-bit instructions.

3. The adaptive video encoder of claim 1, wherein one or more of data storage access bandwidth, operating clock frequency, processor time, available processing time, digital processor power availability, number of processors, and encoded data storage space availability change during encoding of the first sequence of macroblocks.

4. The adaptive video encoder of claim 1, wherein one or more of the first set of the video encoding tools and the second video encoding tools implement intra-macroblock video encoding techniques.

5. The adaptive video encoder of claim 4, wherein the intra-macroblock video encoding techniques allow variations in macroblock and sub-macroblock size.

6. The adaptive video encoder of claim 1, wherein each of the first set of video encoding tools and the second set of video encoding tools implements one or more of: motion estimation search algorithm variants, macroblock and sub-macroblock size variations, intra prediction modes, interprediction modes, in-loop or out-of-loop deblocking variations, sub-pixel interpolation variations, and image pre-compression pre-processing algorithms.

7. The adaptive video encoder of claim 6, wherein the image pre-compression preprocessing algorithms include a low pass filter.

8. The adaptive video encoder of claim 1, wherein a selection between the first set of video encoding tools and the second set of video encoding tools are is made by referencing one or more look up tables.

9. The adaptive video encoder of claim 1, wherein a selection between the first set of video encoding tools and the second set of video encoding tools are is made using an optimization algorithm.

10. The adaptive video encoder of claim 1, wherein a plurality of macroblocks in the frame are arranged in one or more rows and the first check progress macroblock is at a beginning of a row.

11. The adaptive video encoder of claim 1, wherein a plurality of macroblocks in the frame are arranged in one or more rows, and the first check progress macroblock is at an end of a row.

12. The adaptive video encoder of claim 1, wherein the counter is further configured to measure another elapsed length of time for encoding from the initial macroblock of the frame to a second check progress macroblock between the first check progress macroblock and the final macroblock of the frame, and wherein the processor is further configured to:
   receive the other elapsed time from the counter, the other elapsed time representing a total time taken to encode the first sequence of macroblocks and the second sequence of macroblocks;
   determine whether the second elapsed time is shorter than or equal to another predetermined time representing an expected total time for encoding the first sequence of macroblocks and the second sequence of macroblocks;
   responsive to determining that the second elapsed time is longer than the other predetermined time, use a third set of video encoding tools for encoding a third sequence of macroblocks subsequent to the second sequence of macroblocks, the third set of video encoding tools implementing at least one video processing algorithm different from the first set of video encoding tools or the second set of video encoding tools used to encode the second sequence of macroblocks.

13. A method for dynamically encoding a video comprising:
   receiving a frame of the video, the frame comprising a plurality of macroblocks;
   encoding a first sequence of macroblocks of the frame comprising an initial macroblock of the frame, a check progress macroblock, and macroblocks between the initial macroblock and the check progress macroblock, the check progress macroblock placed between the initial macroblock and a final macroblock of the frame using a first set of video encoding tools each video encoding tool implementing a video processing algorithm;
   measuring an elapsed time taken to encode the first sequence of macroblocks;

determining whether the measured elapsed time is shorter than or equal to a predetermined time, the predetermined elapsed time representing an expected elapsed time for encoding the first sequence of macroblocks;

responsive to determining that the measured elapsed time is shorter than or equal to the predetermined time, using the first set of video encoding tools for encoding a second sequence of macroblocks of the frame subsequent to the first sequence of macroblocks; and responsive to determining that the measured elapsed time is longer than the predetermined time, using a second set of video encoding tools for encoding the second sequence of macroblocks of the frame, the second set of video encoding tools implementing at least one video processing algorithm different than the first set of video tools.

14. The method of claim 13, wherein one or more of the first set of video encoding tools and the second set of video encoding tools implement intra-macroblock video encoding techniques.

15. The method of claim 14, wherein the intra-macroblock video encoding techniques allow variations in macroblock and sub-macroblock size.

16. The method of claim 13, wherein each of the first set of video encoding tools and the second set of video encoding tools implements one or more of: motion estimation search algorithm variants, macroblock and sub-macroblock size variations, intra prediction modes, inter prediction modes, in-loop or out-of-loop deblocking variations, sub-pixel interpolation variations, and image pre-compression preprocessing algorithms.

17. The method of claim 16, wherein the image pre-compression preprocessing algorithms include a low pass filter.

18. The method of claim 13, wherein a selection between the first set of video encoding tools and the second set of video encoding tools is made by referencing one or more look up tables.

19. The method of claim 13, wherein a selection between the first set of video encoding tools and the second set of video encoding tools is made using an optimization algorithm.

20. The method of claim 13, wherein the plurality of macroblocks are arranged in one or more rows and the first check progress macroblock is at a beginning of a row.

21. The method of claim 13, wherein the plurality of macroblocks are arranged in one or more rows, and the first check progress macroblock is at an end of a row.

22. The method of claim 13, further comprising:
measuring another elapsed time representing a total time taken to encode the first sequence of macroblocks and the second sequence of macroblocks, wherein the second sequence of macroblocks is between the first check progress macroblock of the frame and a second check progress macroblock of the frame;

determining whether the other elapsed time is shorter than or equal to another predetermined time representing an expected total time for encoding the first sequence of macroblocks and the second sequence of macroblocks;

responsive to determining that the second elapsed time is longer than the other predetermined time, using a third set of video encoding tools for encoding a third sequence of macroblocks subsequent to the second sequence of macroblocks, the third set of video encoding tools implementing at least one video processing algorithm different from the set of video encoding tools used to encode the second sequence of macroblocks.

23. A non-transitory computer readable storage medium storing instructions, the instructions when executed by a processor cause the processor to:
receive a frame of a video to be encoded, the frame comprising a plurality of macroblocks;

encode a first sequence of macroblocks of the frame comprising an initial macroblock of the frame, a check progress macroblock, and macroblocks between the initial macroblock and the check progress macroblock, the check progress macroblock placed between the initial macroblock and a final macroblock of the frame using a first set of video encoding tools, each video encoding tool implementing a video encoding algorithm;

measure an elapsed time taken to encode the first sequence of macroblocks;

determine whether the measured elapsed time is shorter than or equal to a predetermined time, the predetermined elapsed time representing an expected elapsed time for encoding the first sequence of macroblocks;

responsive to determining that measured elapsed time is shorter than or equal to the predetermined time, use the first set of video encoding tools for encoding a second sequence of macroblocks of the frame subsequent to the first sequence of macroblocks; and responsive to determining that the measured elapsed time is longer than the predetermined time, use a second set of video encoding tools for encoding the second sequence of macroblocks of the block, the second set of video encoding tools implementing at least one video processing algorithm different from the first set of video tools.

24. The storage medium of claim 23, wherein one or more of the first set of video encoding tools and the second set of video encoding tools implement intra-macroblock video encoding techniques.

25. The storage medium of claim 24, wherein the intra-macroblock video encoding techniques allow variations in macroblock and sub-macroblock size.

26. The storage medium of claim 23, wherein each of the first set of video encoding tools and the second set of video encoding tools implements one or more of: motion estimation search algorithm variants, macroblock and sub-macroblock size variations, intra prediction modes, inter prediction modes, in-loop or out-of-loop deblocking variations, sub-pixel interpolation variations, and image pre-compression processing algorithms.

27. The storage medium of claim 26, wherein the image pre-compression preprocessing algorithms include a low pass filter.

28. The storage medium of claim 23, wherein a selection between the first set of video encoding tools and the second set of video encoding tools is made by referencing one or more look up tables.

29. The storage medium of claim 23, wherein a selection between the first set of video encoding tools and the second set of video encoding tools is made using an optimization algorithm.

30. The storage medium of claim 23, wherein the plurality of macroblocks are arranged in one or more rows and the first check progress macroblock is at a beginning of a row.

31. The storage medium of claim 23, wherein the plurality of macroblocks are arranged in one or more rows, and the first check progress macroblock is at an end of a row.

32. The storage medium of claim 23, further storing instructions that cause the processor to:
measure a second elapsed time representing a total time taken to encode the first sequence of macroblocks and the second sequence of macroblocks, wherein the second sequence of macroblocks is between the first check progress macroblock of the frame and a second check progress macroblock of the frame;

determine whether the second elapsed time is shorter than or equal to another predetermined time representing an expected total time for encoding the first sequence of macroblocks and the second sequence of macroblocks;

responsive to determining that the second elapsed time is longer than the other predetermined time, use a third set of video encoding tools for encoding a third sequence of macroblocks subsequent to the second sequence of macroblocks, the third set of video encoding tools implementing at least one video processing algorithm different from the first set of video encoding tools or the second set of video encoding tools used to encode the second sequence of macroblocks.

* * * * *

UNITED STATES PATENT AND TRADEMARK OFFICE
CERTIFICATE OF CORRECTION

PATENT NO. : 8,879,636 B2
APPLICATION NO. : 12/154783
DATED : November 4, 2014
INVENTOR(S) : Carl Norman Graham et al.

Page 1 of 1

It is certified that error appears in the above-identified patent and that said Letters Patent is hereby corrected as shown below:

IN THE CLAIMS

- In claim 6, on column 16, line 17, after "second set of video encoding tools are" delete "is"; and
- In claim 9, on column 18, line 21, after "second set of video encoding tools are" delete "is".

Signed and Sealed this
Twenty-seventh Day of October, 2015

Michelle K. Lee
*Director of the United States Patent and Trademark Office*